March 30, 1954 F. H. STIELTJES 2,673,895

BALANCING OF CARRIER CABLES

Filed Feb. 2, 1950 2 Sheets-Sheet 1

INVENTOR.

Frederik H. Stieltjes

BY

[signature]

March 30, 1954 F. H. STIELTJES 2,673,895

BALANCING OF CARRIER CABLES

Filed Feb. 2, 1950 2 Sheets-Sheet 2

INVENTOR.
FREDERICK H. STIELTJES
BY R. P. Morris
ATTORNEY

Patented Mar. 30, 1954 2,673,895

UNITED STATES PATENT OFFICE 2,673,895

BALANCING OF CARRIER CABLES

Frederik H. Stieltjes, Eindhoven, Netherlands, assignor to The International Standard Electric Corporation, New York, N. Y.

Application February 2, 1950, Serial No. 141,898

Claims priority, application Netherlands September 24, 1940

3 Claims. (Cl. 179—78)

The present invention relates to the balancing of a carrier cable and more particularly to the balancing of a high frequency carrier cable.

This application is a continuation-in-part of my application Serial No. 766,708, filed August 6, 1947, now abandoned, for Method of Balancing a Carrier Cable and Cable Balanced According to This Method.

It has been discovered that the known methods for correcting the near-end and the far-end cross-talk in a cable having several conductors are inadequate when the frequency of the signals exceeds 40 kc. per second. Beyond this value effects called hereinafter asymmetrical far-end cross-talk disturb the transmission which at lower frequencies are too small for interfering with the transmission.

The invention will be more fully understood from the following detailed description with reference to the accompanying drawings in which Figures 1 and 2 are two circuit diagrams of a disturbing circuit and a disturbed circuit;

Figure 3 is a diagrammatic perspective view of a spiral-four group cable;

Figure 4A, B, C, are wiring diagrams of balancing methods according to the invention; and Figure 5 shows a cable embodying another balancing method according to the invention;

Figures 1, 2, 3, 4, 5:
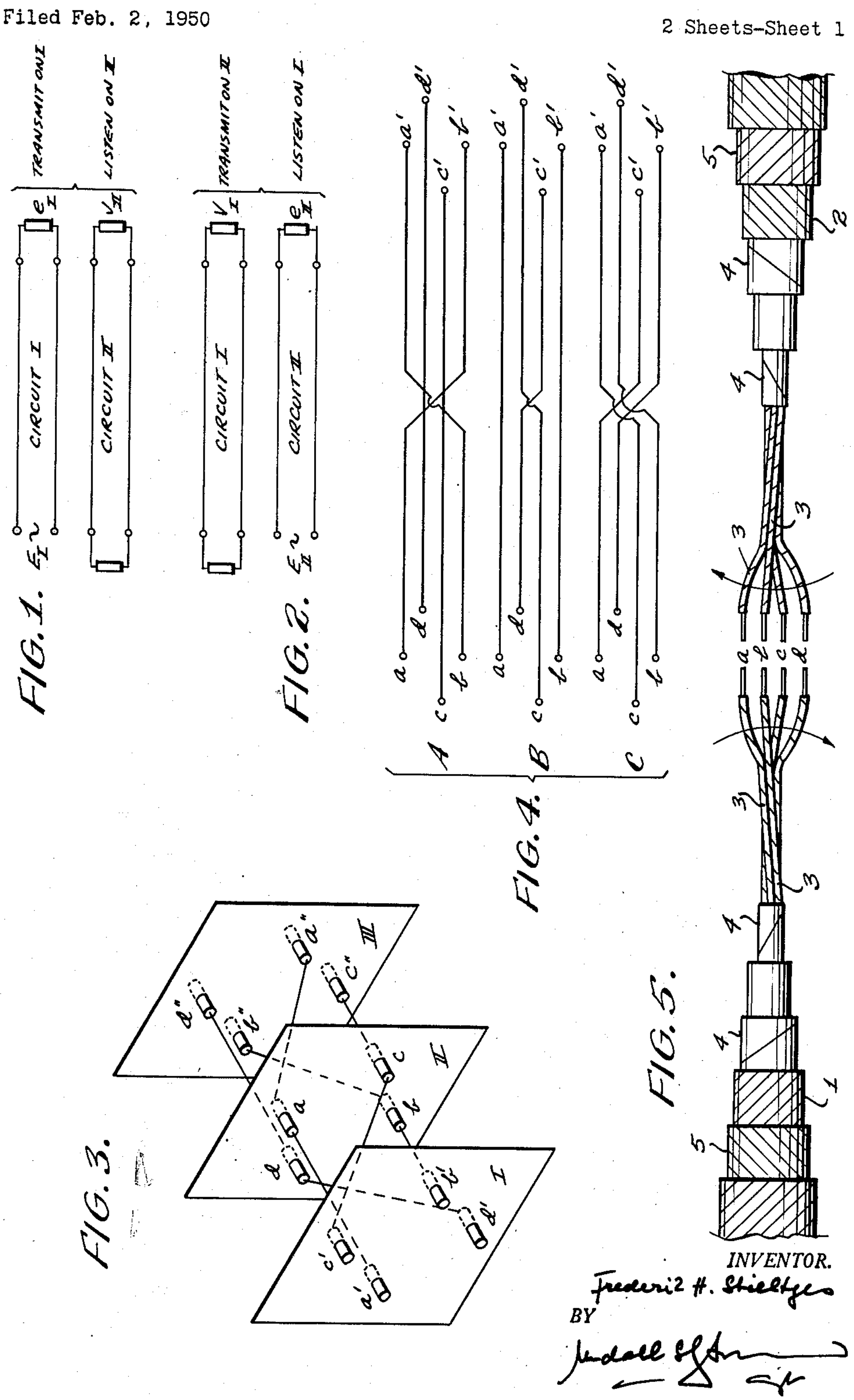

Referring now to the drawings and first to the diagrams shown in Figures 1 and 2, each diagram comprises two circuits I and II. In the diagram according to Figure 1, circuit I is the transmission circuit which is supplied with a signal voltage $E_I$ which causes a voltage $e_I$ at an impedance terminating the far end of circuit I. Circuit II is terminated on both ends by impedances a voltage $v_{II}$ appearing on the far-end impedance when circuit I is fed with the voltage $E_I$ as shown. The reduced far-end cross-talk ratio is defined by $$t_{I,\,II}=\frac{v_{II}}{e_I}$$

Conversely circuit II may be the transmission circuit and circuit I the listening circuit as shown in Figure 2 in which a signal voltage $E_{II}$ is supplied to circuit II where it produces a voltage $e_{II}$ across an impedance arranged at the far-end and induces voltages in circuit I which is terminated by proper impedances on both ends, the induced voltage at the far-end being $v_I$. The reduced far-end cross-talk ratio is defined by $$t_{II,\,I}=\frac{v_I}{e_{II}}$$

These two far-end cross-talk ratios are not necessarily equal. If they are unequal the far-end cross-talk is said to be asymmetrical, in which case $$t_{I,II}\neq t_{II,I}$$

If the far-end cross-talk is symmetrical, $$t_{I,II}=t_{II,I}$$

If the far-end cross-talk is asymmetrical, it can be considered as consisting of two components, a symmetrical component $t_s$ and an alternating or anti-symmetrical component $t_a$ so that $$t_{I,II}=t_s+t_a$$

and $$t_{II,I}=t_s-t_a$$

In practice the cross-talk ratios are measured in decibels so that $$b_{I,II}=-20\log|t_{I,II}|$$

and $$b_{II,I}=-20\log|t_{II,I}|$$

The known balancing methods which aim at the suppression of the symmetrical far-end cross-talk allow only one of the far-end cross-talk ratios to be improved for instance that for transmission on circuit I and listening on circuit II. When a cable is balanced according to the known balancing methods the other far-end cross-talk ratio (for instance that for transmission on circuit II and listening on circuit I) may become worse than it was before the balancing was carried out.

The following summarizes some of the causes of the far-end cross-talk between two circuits:

(a) A first cause consists in direct capacitive, magnetic and resistance couplings between the two circuits which cause normal near-end and far-end cross-talk;

(b) A second cause consists in the coupling of the two circuits with one or more third circuits. Such couplings cause a transmission of energy from the disturbing circuit to the third circuit which in turn acts as a disturbing circuit on the other, the disturbed circuit. Thus an indirect far-end cross-talk is caused between the disturbing circuit and the disturbed circuit.

If the disturbing and disturbed circuits are equal to each other they have the same transmission properties. If also the coupling mentioned under (*a*) are predominating over those under (*b*), only a direct symmetrical far-end cross-talk exists between the two circuits which can be easily balanced by known methods. Since both circuits have the same transmission properties the disturbing voltage in one circuit and the far-end cross-talk voltage in the other circuit are subject to the same modifications during their propagation over the circuits. Thus it is irrelevant where the coupling between the two circuits is arranged so that the far-end cross-talk voltage can be reduced by a suitable counter-coupling between the two circuits which may be arranged anywhere.

However, neither the near-end cross-talk caused by direct couplings between the two circuits nor the indirect far-end cross-talk has the property that the disturbing voltage in the disturbing circuit and the disturbed voltage in the disturbed circuit are subject to the same modifications. This fact is probably the reason for the fact mentioned hereabove that at a frequency exceeding 40 kc. per sec. an asymmetrical far-end cross-talk becomes troublesome which is negligible at low frequencies and cannot be easily balanced.

I have found however, that unexpectedly at these high frequencies the group transmission properties are unequal, so that an asymmetrical far-end cross-talk appears, the character of which is systematic, for instance proportional to the square of frequency, and my invention allows to balance this asymmetrical far-end cross-talk.

In reducing the asymmetrical far-end cross-talk according to this invention, the following should be taken into consideration:

(*a*) It is shown in the copending application Serial No. 141,899, filed February 2, 1950, for Balancing Carrier Cables, that a powerful remedy against asymmetrical far-end cross-talk consists in reducing the differences between the phase rotations below an allowable limit. Although the asymmetrical cross-talk can be reduced by this method, it is, nevertheless, desirable not to allow the differences in phase rotation to increase unduly per section of the cable.

(*b*) Care should be taken that a particular near-end cross-talk does not for some reason or another, become troublesome and is converted into a far-end cross-talk.

(*c*) The indirect far-end cross-talk should be so small in comparison to the direct far-end cross-talk that it can be neglected with respect to the latter.

With respect to (*b*), it is remarked that a near-end cross-talk is converted to a far-end cross-talk if reflections in the circuits come into play. This is a reason why the circuits should be properly terminated which especially holds good for the reception side of the disturbing circuit and for the transmission side of the disturbed circuit. Also a non-homogeneity of the two circuits causing internal reflections is to be taken into consideration here. This effect, however, does not become troublesome as long as the frequency does not exceed 200 kc. per sec.

It has been discovered that two causes for a systematical asymmetrical far-end cross-talk between pairs of one group which are connected with the spiralling of the star groups which form quads, the so-called four spiral groups in the cable. These two causes will be indicated hereinafter by the term "helical coupling." Tests made with laid cables have shown that asymmetrical far-end cross-talk occurs to a great extent in circuit of one star group. The two circuits do not differ greatly in transmission properties and characteristic impedances; however, it appears that the phenomenon cannot be explained by "indirect cross-talk."

The first phenomenon of the so-called "helical couplings" is connected with the presence of electric and magnetic fields in helical groups which extend longitudinally.

Figure 3 shows part of a spiralled group comprising two pairs *a*, *b* and *c*, *d* showing a spiral coupling effect which the present invention aims at reducing.

Three successive normal planes I, II and III are shown in Fig. 3. The first conductor cuts the plane I at $a^1$, plane II at $a$, and plane III at $a''$. The second conductor cuts the planes, respectively, at $b^1$, $b$, and $b''$, etc. It is seen from Fig. 3 that the cable is wound helically that is, the points of intersections of the four conductors with the successive planes are turned through an angle of 90° from one plane to the following one. If the middle plane II is taken as plane of reference the following couplings have to be considered:

1. A coupling between the pair *a*, *b* and the pair $c'$, $d'$.

2. A coupling between the pair *a*, *b* and the pair $c''$, $d''$.

At low frequencies the well-known Maxwell telegraph equation is satisfied and the couplings between the pairs are of opposite sign and balance each other.

At high frequencies, however, the couplings do not balance each other because a phase difference between voltages and currents of the elements $c'$, $d'$ and the elements $c''$, $d''$ of the same pair occurs. This phase difference is proportional to the circular frequency $\omega$. The cross-talk ratio due to the magnetic and capacitive coupling is also proportional to $\omega$. The resultant of the two, i .e. the uncompensated part of the coupling, is therefore proportional to $\omega^2$.

A magnetic or capacitive coupling causes a disturbance which is displaced in time by 90° with respect to the inducting voltage or current. Two equal but slightly dephased voltages produce a resultant which is displaced by 90° with regard to the equal voltages. In the disturbed circuit the resultant spiral coupling effect is therefore in phase with the disturbing voltages and currents.

The first phenomenon of the so-called "helical coupling" effects is thus seen to be connected with the existence of longitudinal electric and magnetic fields and with the longitudinal phase rotations.

The second cause is connected with the existence of small capacitive and magnetic couplings oscillating around a mean value equalling zero which are concurrent with small oscillations of the effective inductance and mutual capacity between pairs of conductors around a mean positive value.

The periodic fluctuations in capacities and inductances are caused by capacities and inductances are caused by the fact that the torsion on the quad which makes the four conductors constituting the quad successively take different positions with respect to the surroundings in the cable as a consequence spiralisation of the quad. These produce fluctuations in mutual capacity and inductance around a positive value for the two pairs as shown in Figures 6 and 7 of the drawings and fluctuations of the magnetic and capacitive unbalance between the two pairs around zero as shown in Figure 8 of the drawings.

Figure 6:
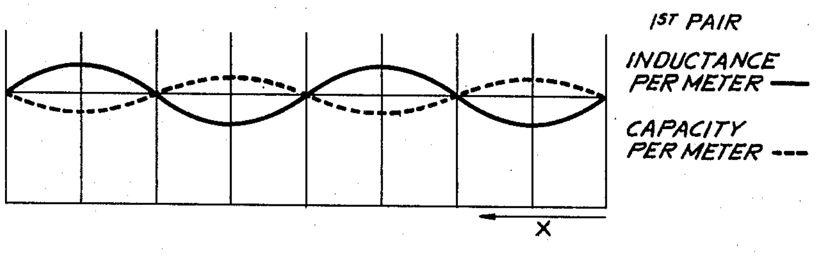
Figures 6 and 7 are diagrams showing, respectively, the specific inductance and capacity of the two pairs of conductors of a spiral-four group cable in dependence on the distance from the end of the cable.

Figure 6 shows for the first pair the inductance per meter in full lines and the capacity per meter in dotted lines as a function of the distance from the end of the cable. It will be seen that the specific inductance and capacity fluctuate about a mean value which appears to be identical in Figure 6 by a suitable choice of units for the specific inductance and specific capacity.

Figure 7:
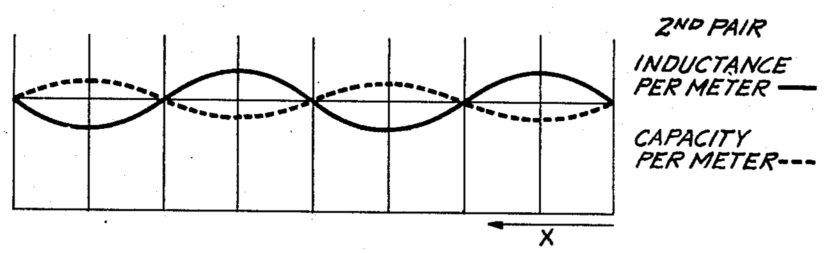
Figure 8:
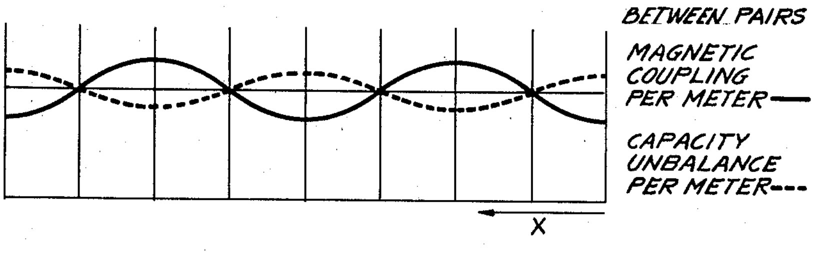
Figure 8 is a diagram showing similar curves as Figures 6 and 7 illustrating the specific magnetic coupling and capacitive unbalance.

Figure 7 shows the same curves for the second pair of the cable, and Figure 8 shows the specific magnetic coupling in full lines and the specific capacitive unbalance in dotted lines which exist between the two pairs of conductors of the cable.

As will be seen from Figures 6 and 7, the specific capacity in the first pair has a maximum at places where the specific capacity in the second pair has its minimum, and where the specific inductance in the first pair has a minimum and the specific inductance in the second pair has a maximum. These maxima and minima coincide with the zero values of the specific magnetic coupling and the specific capacitive unbalance between the pairs as shown in Figure 8.

Figures 9, 10:
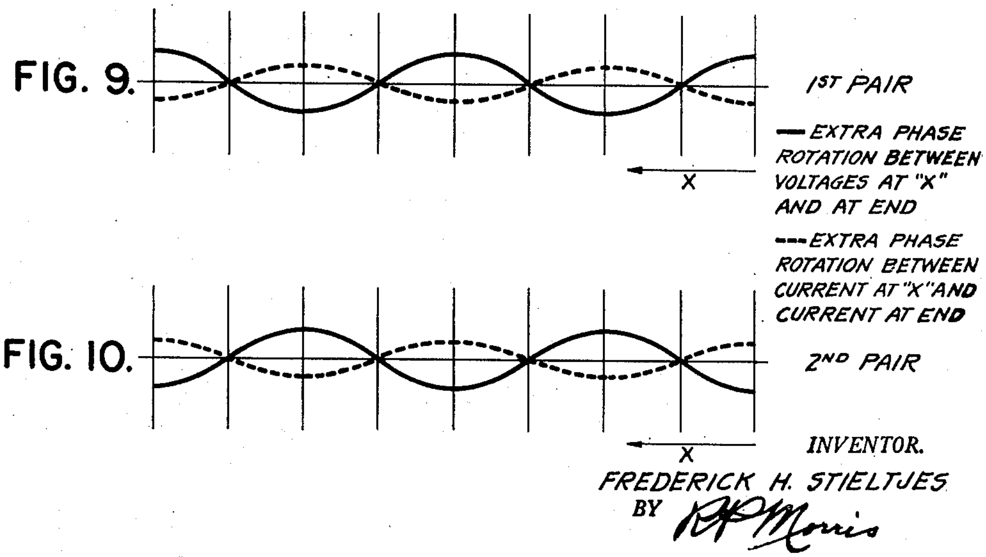
Figures 9 and 10 are diagrams showing the phase rotations of voltages, respectively, currents between a point of a cable and its end for the pairs, constituting the cable.

Figures 9 and 10 are diagrams similar to Figures 6 and 7 showing the extra-phase fluctuations in the voltages and currents which are caused by the fluctuations of the specific inductance and specific capacity of the pairs shown in Figures 6 and 7. The curves in Figures 9 and 10 give the ratio between the voltages (currents) at a point $x$ to the voltage (current) at the end of the pair in question and are exclusively due to the variations of the inductance or capacity. These variations are additional to the normal rotations to which a wave in propagation is subjected. For normal propagation is $$E_x=E_t\varepsilon^{jb_n}$$

where $b_n=wx$ and $$I_x=I_t\varepsilon^{jb_n}$$

If fluctuations of the specific inductance and the specific capacity come into play the formula for $E_x$ becomes $$E_x=E_t\varepsilon^{jb_n}\varepsilon^{jv_1}$$

These extra phase variations have their maxima at the points where the fluctuations in inductance and in capacity are zero. Therefore they are in phase or in opposition to the unbalance fluctuations.

The oscillations in magnetic coupling and the variation in capacity between the pairs of the cable produce a "helical coupling." Alternatively the "helical coupling" may be due to oscillating capacitive coupling acting on a circuit in which variations in inductance occur.

The extra-phase fluctuations in the voltages and currents, if small, induce an extra-phase rotation of 90°, when the disturbance arrives at the end of the cable. So again the alternating far-end cross-talk is in phase with the disturbing voltage at the end.

If magnetic and capacitive couplings exist at the same time a disturbance is introduced which is displaced in time by 90° with respect to the inducing voltage current.

The iterative impedance and the admittance show also oscillations but they are unimportant from the point of view of the invention because a more close investigation which will not be given here shows that only the paralleled admittances from the point $x$ to the right and left or the series impedances for the right and left-hand part occur in the formulas which are constant throughout.

Since in helical groups fields occur which extend longitudinally, couplings can arise, as shown in Fig. 3, between parts of the circuits situated at a certain longitudinal distance from each other. These fields are also present in low frequency cables with helical groups. At low frequencies, however, the resulting effects are so slight as to escape attention. For higher frequencies, however, they become troublesome. The consequences of this effect are the alternating part of the far-end cross-talk mentioned hereinabove. They are closely connected with the fact that the groups are spiral. Evidently the magnitude of the effect will depend on the pitch of the spirals so that the effect has not the same magnitude for different groups.

The invention consists in that before balancing a carrier cable by the usual means the helical coupling effect is reduced to a negligible amount.

The cable to which the invention is applied, is a carrier cable in which the conductors even for high frequencies have so little mutual difference or have so little mutual coupling that a reasonable transmission of these frequencies without disturbing far-end cross-talk between adjacent groups is guaranteed. The particular object of the present invention is to avoid an appreciable far-end cross-talk between pairs of conductors belonging to the same star groups, and the invention consists in that the helical coupling effect in a star group of a first cable section is compensated by the effect of a second section of the same magnitude.

As a means to reduce the cross-talk between physical circuits of the same group, a crosswise exchange of conductors is applied which is preferably done at the places where cable sections are jointed to one another.

Figure 4 shows several embodiments of such crossings. Each section of the cable contains a group of four conductors $a$, $b$, $c$, $d$ and $a'$, $b'$, $c'$, $d'$, respectively, which are arranged in equal spacial relationships in the sections so that for instance the conductors $a$ and $a'$ are shown uppermost in the sections corresponding to the position of conductor $a$ in the plane II of Fig. 3, etc.

Figure 4A shows an $a$—$b$ crossing i. e. the conductor $a$ in the first section is connected to the conductor $b'$ in the second section and the conductor $b$ of the first section is connected to the conductor $a'$ of the second section, whereas conductor $c$ of the first section is connected to conductor $c'$ of the second section and conductor $d$ of the first section is connected to conductor $d'$ of the second section.

Figure 4B shows a $c$—$d$ crossing. Conductor $c$ and $d$ of the first section are connected, respectively, to conductor $c'$ and $d'$ of the second section and conductors $a$ and $b$ of the first section are connected, respectively, to conductors $a'$ and $b'$ of the second section.

Figure 4C shows a duplex crossing in which conductor $a$ of the first section is connected to conductor $c'$ of the second section, conductor $b$ of the first section is connected to conductor $b'$ of the second section, conductor $c$ of the first section is connected to conductor $a'$ of the second section, and conductor $d$ of the first section is connected to conductor $b'$ of the second section.

These crossings are preferably carried out between each pair of consecutive sections of the cable in a systematical manner so as to suppress the systematical far-end cross-talk referred to hereinabove.

Referring now to Fig. 5 illustrating another embodiment of the present invention, two sections 1 and 2 of a cable are shown, each section consisting of four insulated conductors *a, b, c, d* enclosed individually by helically wound insulating layers 3, which are enclosed by common insulating layers 4 and sheathings 5 which may consist of lead. The conductors *a, b, c, d* in section 1 are twisted in a left-hand sense whereas conductors *a, b, c, d* of section 2 are twisted in a right-hand sense, the different senses of twisting being indicated in Fig. 5 by the circular arrows. The cable is built up of a great many sections such as 1 and 2 and shows no spiral coupling effect since the helices of one section are wound opposite to those of the consecutive section, at the same time maintaining the pitch of the helices constant throughout the sections. The adjacent cable sections are connected in a straight-on way without any crossings of conductors.

It will be understood that each of the elements described above, or two or more, together, may also find a useful application in other types of carrier cables differing from the types described above.

While I have illustrated and described the invention as embodied in carrier cables for transmitting high frequency signals, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What I claim as new and desire to secure by Letters Patent is:

1. A method of balancing a cable having sections consisting of spiral-four groups of conductors, against high frequency far-end cross-talk, comprising the step of joining two cable sections straight on with the sections having opposite helical directions, the composition of the spiral-four groups in the sections being otherwise identical throughout.

2. A method of balancing a cable having sections consisting of spiral-four groups of conductors against high frequency far-end cross-talk, comprising the step of joining consecutive cable sections straight on with the consecutive sections having opposite helical directions, the composition of the spiral-four groups in the sections being otherwise identical throughout.

3. A high frequency cable having conductors forming star groups comprising sections each including two pairs of conductors, said sections having longitudinally consecutively opposite helical directions of said pairs of conductors.

FREDERIK H. STIELTJES.

References Cited in the file of this patent

UNITED STATES PATENTS

| Number | Name | Date |
|---|---|---|
| 1,277,025 | Anderegg et al. | Aug. 27, 1918 |
| 1,720,616 | Werren | July 9, 1929 |
| 1,726,551 | Ford | Sept. 3, 1929 |
| 1,792,273 | Byk et al. | Feb. 10, 1931 |
| 1,915,442 | Nyquist | June 27, 1933 |
| 1,922,138 | Nyquist | Aug. 15, 1933 |
| 2,167,016 | Weaver | July 25, 1939 |